(12) United States Patent
Ishikawa et al.

(10) Patent No.: US 9,172,833 B2
(45) Date of Patent: Oct. 27, 2015

(54) MULTIFUNCTION DEVICE

(71) Applicant: SEIKO EPSON CORPORATION, Tokyo (JP)

(72) Inventors: Takaaki Ishikawa, Nagano (JP); Tsuneo Handa, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/017,478

(22) Filed: Sep. 4, 2013

(65) Prior Publication Data

US 2014/0071469 A1     Mar. 13, 2014

(30) Foreign Application Priority Data

Sep. 7, 2012   (JP) ................................. 2012-196931

(51) Int. Cl.
| | | |
|---|---|---|
| *G06K 15/00* | (2006.01) | |
| *H04N 1/00* | (2006.01) | |
| *G06F 3/12* | (2006.01) | |
| *H04N 1/10* | (2006.01) | |
| *H04N 1/193* | (2006.01) | |

(52) U.S. Cl.
CPC ....... *H04N 1/00551* (2013.01); *H04N 1/00519* (2013.01); *H04N 1/00594* (2013.01); *H04N 1/1017* (2013.01); *H04N 1/193* (2013.01); *H04N 2201/0091* (2013.01); *H04N 2201/0422* (2013.01)

(58) Field of Classification Search
CPC ....................... H04N 1/00594; H04N 1/00551
See application file for complete search history.

(56) References Cited

U.S. PATENT DOCUMENTS

| | | | | |
|---|---|---|---|---|
| 5,915,691 | A | * 6/1999 | Deguchi et al. | .......... 271/265.01 |
| 2006/0239752 | A1* | 10/2006 | Shiraishi et al. | .............. 400/691 |
| 2009/0128842 | A1* | 5/2009 | Nakayama et al. | .......... 358/1.13 |

FOREIGN PATENT DOCUMENTS

| | | |
|---|---|---|
| JP | 06-070074 A | 3/1994 |
| JP | 2002-057847 A | 2/2002 |
| JP | 2007-078995 A | 3/2007 |
| JP | 2012-135937 A | 7/2012 |
| JP | 2012-160841 A | 8/2012 |

* cited by examiner

*Primary Examiner* — Dov Popovici
(74) *Attorney, Agent, or Firm* — Global IP Counselors, LLP (57) ABSTRACT

A multifunction device includes a case having a document tray provided in an upper part, a cover section provided above the case and covering the document tray, a reading section held in an inside part of the case and scanning a document that is placed in the document tray, a recording section held in the inside of the case and recording on a paper as a recoding medium, an inserting section inserting the document between the document tray and the cover section, and an opening section for discharging a recording medium provided in the case and discharging the paper recorded by the recording section. The inserting section functions as an exit that discharges the document from between the document tray and the cover section.

6 Claims, 6 Drawing Sheets

MULTIFUNCTION DEVICE

CROSS-REFERENCE TO RELATED APPLICATIONS

This application claims priority to Japanese Patent Application No. 2012-196931 filed on Sep. 7, 2012. The entire disclosure of Japanese Patent Application No. 2012-196931 is hereby incorporated herein by reference.

BACKGROUND

1. Technical Field

The present invention relates to a multifunction device.

2. Related Art

A configuration of general multifunction devices is configured by a printer section having an image-forming section in a lower part, and a reading section reading an original document in an upper part. For example, in Japanese Laid-open Patent Application Publication No. 2012-160841, a sheet feed mechanism that conveys a document to an image-reading section is provided. To prevent the operations of the sheet feed mechanism from interfering, any objects cannot be placed on the upper part of the multifunction device. Also, for example, in Japanese Laid-open Patent Application No. 2012-135937, a desktop type multifunction device, which is provided with a reading section manually setting one document by hand without providing a sheet feed mechanism, is disclosed. In the multifunction device of Japanese Laid-open Patent Application No. 2012-135937, a cover covering a document tray can be opened and closed, and to prevent the opening and closing operations of the cover from interfering, any objects cannot be placed on the upper part of the multifunction device.

Such multifunction devices do not allow placing any objects on the upper part so that a space above the multifunction devices has to be open. In this state, specifically, small type multifunction devices such as a desktop type multifunction device are very inconvenient. Thus, for example, in Japanese Laid-open Patent Application No. 2007-78995, as an example of solving the problem to utilize an upper part of malfunction devices, a top plate is provided so as to place objects, paper materials, and the like on the top of the multifunction devices so that it discloses a configuration to utilize a space above the multifunction devices. However, in this device configuration, a space between the reading section and the top plate needs to be secured so that the height of the multifunction devices cannot be lower.

Also, for example, in Japanese Laid-open Patent Application No. 6-70074, it discloses a multifunction device that enables to place an object on a top plate by using a document placing tray. In this case, the size and the volume of the tray are increased in a configuration that sets a document cover to the tray in order to press a document from the top, and the tray and a separate case are mounted on the device so that as a whole, the increasing size of the scanner section is unavoidable. It is necessary to install rollers, and the like to convey the large size tray so that it cannot suppress the height of the multifunction devices to be lower. Japanese Laid-open Patent Application No. 2002-57847 discloses the similar example.

SUMMARY

In the multifunction devices described above, there is a problem that any objects cannot be placed on the upper part and a space above the multifunction devices cannot be utilized. Also, even when it has a configuration to place objects on the upper part by providing a top plate in the upper part of the multifunction devices, the size of the multifunction devices cannot be compact so that there is a problem of the increasing size.

The present invention is to solve at least a part of the above problems, and it is possible to realize as the following embodiments and applicable examples.

According to an aspect of the invention, a multifunction device is provided with a case having a document tray provided in an upper part thereof; a cover section provided above the case and covering the document tray; a reading section housed in an inside part of the case and configured to scan a document that is placed on the document tray; a recording section housed in the inside part of the case and configured to record on a recoding medium; an inserting section configured to insert the document between the document tray and the cover section; and an opening section provided in the case and configured to discharge the recording medium recorded by the recording section. The inserting section functions as an exit that discharges the document from between the document tray and the cover section.

According to the aspect, the inserting section is provided to insert a document between the document tray and the cover section, and the inserting section functions as an exit to discharge the document from between the document tray and the cover section. Because of this, without opening the cover section, the document is placed on the document tray, and the document can be read by the reading section. Thus, a space above the multifunction device can be utilized such that an object can be placed on the upper part of the cover section. Also, it is not necessary to provide a top plate, and the like to place an object on the upper part of the multifunction device so that it can suppress the increasing size of the multifunction device.

According to another aspect of the invention, in the above described multifunction device, the inserting section and the opening section are provided in the same surface side of the case.

According to the aspect, the operability by a user is improved.

According to another aspect of the invention, in the above described multifunction device, the inserting section and the opening section are provided in a front side of the case.

According to the aspect, the operability by a user is improved.

According to another aspect of the invention, in the above described multifunction device, an upper part of the cover section is flat.

According to the aspect, in a case that an object is placed on the upper part of the cover section, the object can be held in a stable attitude.

According to another aspect of the invention, the above described multifunction device further includes a holding section that has translucency and flexibility, is configured to hold the document, and is configured to enable to be inserted between the document tray and the cover section. The reading section reads the document held in the holding section in a state that the holding section is inserted between the document tray and the cover section.

According to the aspect, the holding section housing a document, which has low rigidity, can be inserted between the document tray and the cover section.

According to another aspect of the invention, the above described multifunction device further includes a height adjustment mechanism section changing a height between the case and the cover section.

According to the aspect, a document configured by a thick paper can be inserted between the document tray and the cover section.

BRIEF DESCRIPTION OF THE DRAWINGS

Referring now to the attached drawings which form a part of this original disclosure.

DETAILED DESCRIPTION OF EXEMPLARY EMBODIMENTS

Hereinafter, the embodiments of the present invention will be described with reference to the drawings.

First Embodiment

Figure 1A:
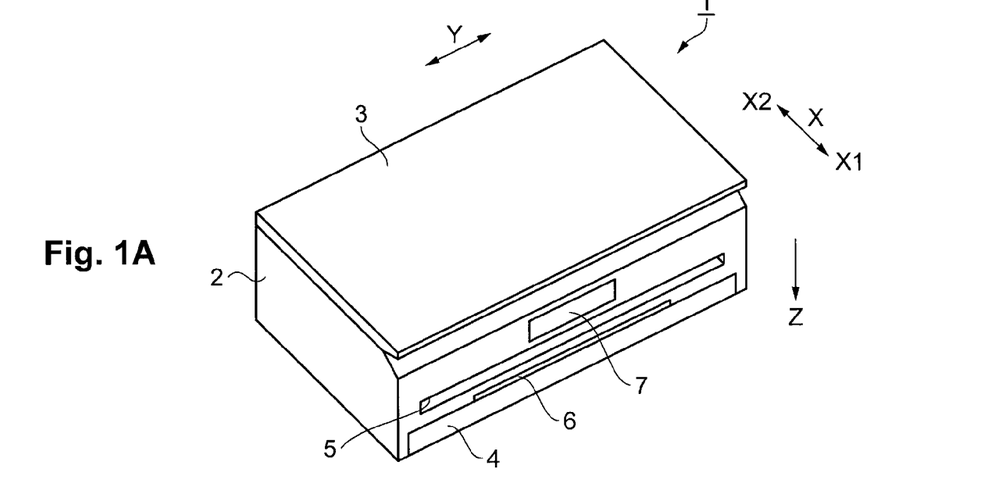
FIG. 1A is a perspective view showing an appearance of a multifunction device, which is viewed from the front side, according to a first embodiment.

FIG. 1A is a perspective view showing an appearance of a multifunction device 1, which is viewed from the front side, according to the present embodiment. In the upper side in a vertical direction Z of a case 2, a cover section 3 is provided. By the way, the discloses of the phrases "above", "upper part", "upper side", "upper end portion", "under", "lower part", and "lower side" indicate the vertical direction Z. In the lower part of the case 2, a paper cassette 4 storing papers as a recording medium. A user pulls the paper cassette 4 out to the front side and enables to set papers.

Figure 1B:
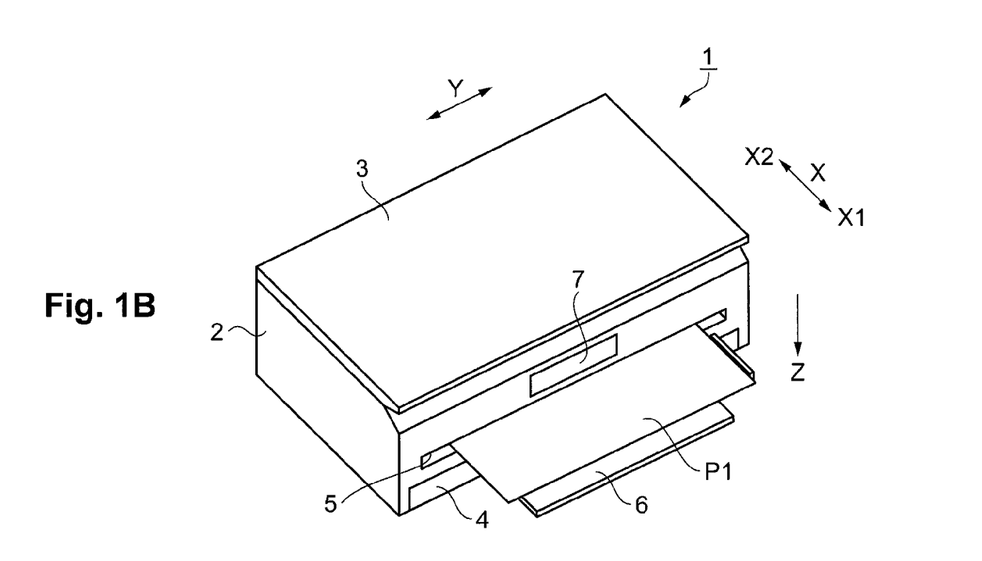
FIG. 1B is a perspective view of an appearance of the multifunction device showing an aspect discharging a paper from an opening section for discharging a recording medium.

FIG. 1B is a perspective view of an appearance of the multifunction device showing an aspect discharging a paper P1 from an opening section 5 for discharging a recording medium. In the front side of the case 2, the opening section 5 for discharging a recording medium, which is long in a paper width direction Y of the paper P1, is provided.

The paper P1 stored in the paper cassette 4 is recorded by a recording section housed in the inside of the case 2, and is discharged to a downstream direction X1 in a conveyance direction X from the opening section 5 for discharging a recording medium. In the front side of the case 2, a stacker 6 is slidably provided under the opening section 5 for discharging a recording medium. A paper P1 discharged from the opening section 5 for discharging a recording medium is placed on the stacker 6, which was pulled out to the front side by the user.

In the front side of the case 2, a touch panel 7 is provided as a control section. By controlling the touch panel by the user, various movement directives can be performed to the multifunction device 1.

Figure 2A:
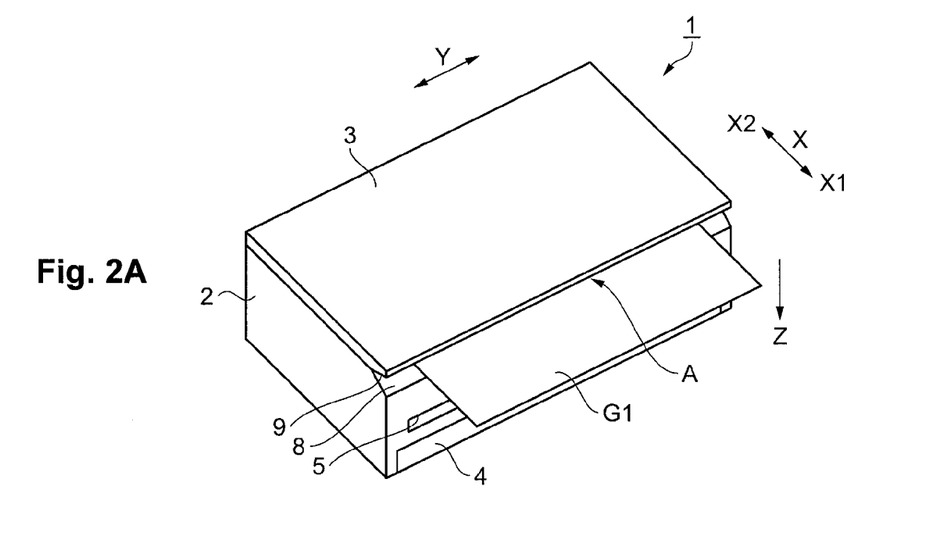
FIG. 2A is a perspective view of an appearance of the multifunction device showing an aspect inserting a document from an inserting section in the state that a cover section is closed.

FIG. 2A is a perspective view of an appearance of the multifunction device 1 showing an aspect inserting a document G1 from an inserting section A in the state that a cover section 3 is closed. In the state that the cover section 3 is closed, an inserting section A, in which the front side is opened, is configured by a guide surface 8 formed on the upper end portion of the front side of the case 2, and a guide surface 9 formed on the end portion of the front side of the cover section 3.

The document G1 is inserted in the lower part of the cover section 3 toward an upstream direction X in the conveyance direction X from the inserting section A. The document G1 inserted from the inserting section A is inserted in the lower part of the cover section 3, and letters or images are read by a reading section housed in the inside of the case 2.

Figure 2B:
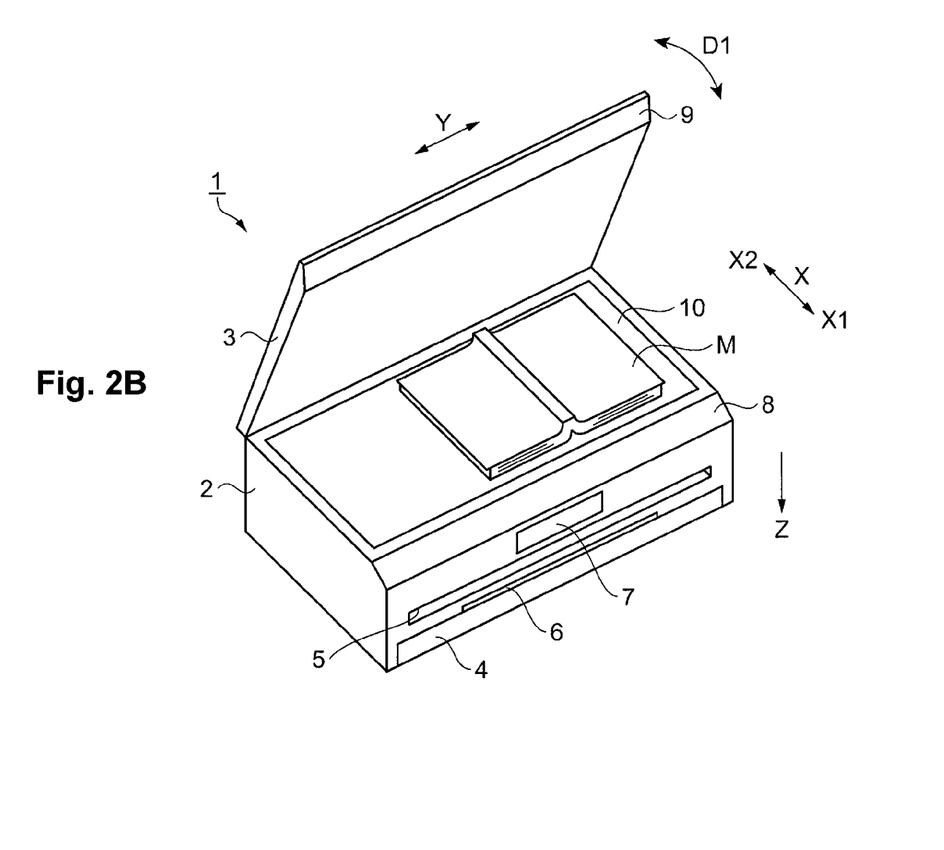
FIG. 2B is a perspective view of an appearance of the multifunction device showing an aspect that a book is placed on a document tray in the state that a cover section is opened.

FIG. 2B is a perspective view of an appearance of the multifunction device 1 showing an aspect that a book M is placed on a document tray 10 in the state that a cover section 3 is opened. The cover section 3 is provided turnably as shown in an arrow D1 at a back side of the upper end portion of the case 2 as a fulcrum.

In the state that the cover section 3 is opened turnably, the user places the book M on the document tray 1 provided on the upper part of the case 2 in opened state. The user closes the cover section 3 turnably so as to cover the book M and the document tray 10. The letters and images drawn in the book M is read by the reading section.

Figure 3:
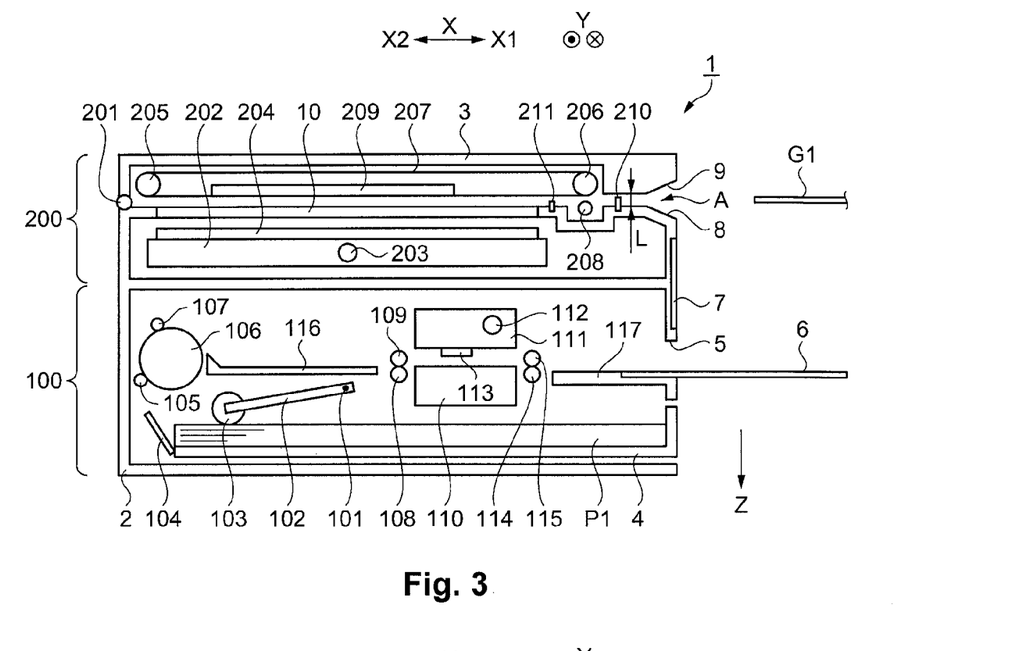
FIG. 3 is a schematic configuration of the multifunction device.

FIG. 3 is an illustration of the multifunction device 1 viewed from the paper width direction Y, and schematically shows a schematic configuration of the multifunction device 1. The multifunction device 1 is configured by providing a recording section 100 in the lower part, a reading section 200 in an upper part together. The recording section 100 will be described.

The paper cassette 4, in which sheet-shaped papers P1 are layered and placed, is installed in the lower side of the recording section 100, and it is installed from the front surface (right side in the drawing) of the case 2.

A pickup roller 103 rotatably driven by a motor (not shown) is provided above the paper cassette 4. The pickup roller 103 is provided in a swinging member 102 that swings as being centered on a pivot shaft 101.

In the back surface side of the paper cassette 4, a separation slant face 104 is provided. The separation slant face 104 contacts with a front edge of a paper P1 fed by a rotation of the pickup roller 103 from the paper cassette 4, and separates the highest position of the paper P1 and on and after next papers P1 by conveying it in the downstream side of the feed route in the state that the paper P1 is contacted with the separation slant face 104.

In the downstream side of the feed route of the separation slant face 104, a feed driving roller 106 driven by a motor, which is not shown, and a separating roller 105 are provided. The separating roller 105 contacts with the feed driving roller 106 and separates the papers P1 again so that only the highest position of the paper P1 is securely conveyed in the downstream side of the feed route.

In the downstream side of the feed route of the separating roller 105, a feed driven roller 107 that is driven and rotated so as to clamp the paper P1 with the feed driving roller 106 is provided. The paper P1 is sent to the feed route 116 side by the feed driving roller 106 and the feed driven roller 107. In addition, in the downstream side of the feed route 116, a conveyance means having a conveyance driving roller 108 driven by a motor, which is not shown, and a conveyance driven roller 109 that is driven and rotated by pressing and contacting to the conveyance driving roller 108 is provided. By this conveyance means, the paper P1 is further sent to the downstream of the feed route.

A recording means is provided in the downstream side of the feed route of the conveyance means. The recording means is provided with a recording head 113, and a support member 110 facing the recording head 113. The recording head 113 is provided in the bottom part of a carriage 111, and faces the conveyed paper P1. The carriage 111 is reciprocally driven in the paper width direction Y by a motor, which is not shown. The ink is discharged from the recording head 113 to the paper P1, which is conveyed in the downstream direction X1 in the conveyance direction X, so that an image is formed.

The support member 110 supports the paper P1 and defines a distance between the paper P1 and the recording head 113. In the downstream side of the support member 110, a discharge means discharging the paper P1 on which the recording was performed is provided. The discharge means is provided with a discharge driving roller 114 and a discharge driven roller 115 that is driven and rotated with the discharge driving roller 114. The paper P1 on which the image was formed is conveyed by the discharge means, and it is discharged from the opening section 5 for discharging a recording medium provided in the front side of the case 2, and it is placed on the stacker 6.

Next, the reading section 200 will be described. In the lower part of the reading section 200, a carriage 202 that is movable in the paper width direction Y by guiding a guide shaft 203 is provided. A line CIS sensor 204 extending in the conveyance direction X is provided in the carriage 202.

In the upper part of the line CIS sensor 204, the document tray 10 configured by a transparent member such as a transparent glass plate is provided in the upper part of the case 2. The document placed on the document tray 10 can be read while the carriage 202 stops and moves in the state that the cover section 3 covers the document tray 10.

In the upper part of the reading section 200, a document conveyance mechanism section configured by including a driving roller 206, a driven roller 205, and a conveyance belt 207 is provided. In the state that the cover section 3 covers the document tray 10, the document conveyance mechanism section conveys the document G1 in the state wedged between the document tray 10 and the cover section 3.

In the inner side of the lower part of the conveyance belt 207, a press pad 209 is attached so that it progresses the close contact between the document G1 and the document tray 10 in an appropriate timing. The conveyance belt 207 is stretched by both of the driving roller 206 and the driven roller 205 to make sure the close contact of the document G1. A brush (not shown) for cleaning contacts to the conveyance belt 207 so that the reliability of the image reading may be improved.

A paper detection sensor 210 and a roller 208 for document pickup and conveyance are provided in the front side in the upper part of the case. The roller 208 for document pickup and conveyance is moved up and down. When it moves the upper side, it has a role that the document G1 is contacted with the conveyance belt 207 and is conveyed.

The cover section 3 and the case 2 are connected by a hinge 201 provided in the back end portion so that the cover section 3 enables to be opened and closed turnably. As described above, in the reading section 200, the document G1 is inserted between the cover section 3 and the document tray 10 in the state that the cover 3 is closed (see FIG. 2A). Also, the cover section 3 is opened and the book M is placed on the document tray 10. Then, the cover section 3 can be closed again (see FIG. 2B).

The normal main mode is an auto loading mode such that the document G1 is inserted between the cover section 3 and the document tray 10 in the state that the cover section 3 is closed, and the document G1 is read. When the cover section 3 is closed, as shown in FIG. 3, a gap L is formed in the end portion of the front side where the cover section 3 and the case 2 face to each other.

An inserting section A that opens in the front side is formed by the guide surface 9 of the cover section 3 and the guide surface 8 of the case 2, and the gap L. When viewing the inserting section A from the front side, it has an appearance slightly opening mouth, and the gap L is a document insertion opening to insert the document G1 in order to set the document G1 between the document tray 10 and the conveyance belt 207. When the document G1 is inserted to the gap L, it is guided by the guide surfaces 8 and 9.

The document G1 inserted in the upstream direction X2 from the inserting section A by the user is conveyed to the upstream direction X2 by the document conveyance mechanism section, and is placed on the document tray 10. The document G1, which was read, is conveyed to the downstream side X1 by the document conveyance mechanism section, and is discharged to the front side from the inserting section A. That is, the inserting section A has a function as an exit of the document G1 discharged after the reading was completed.

As described with reference to FIG. 1B, the paper P1, which was recorded, is discharged to the front side (downstream direction X1) from the opening section 5 for discharging a recording medium. The multifunction device 1 combining such the recording section 100 and the reading section 200 is convenient for a user because handling paper P1 is totally accessed from the front side.

Hereafter, the operations of scanning processes will be described below. First, when the switch of the reading section 200 is turned ON, as an initial operation, it checks whether or not a document is remained on the document tray 10.

When the document was not existed, it directly becomes in a wait condition. When the document was remained, it displays that the document is remained, and any of the following operations is performed. The first corresponding point is to discharge the document remained in the document tray 10. The second corresponding point is to wait for a user's instruction whether letting know the remained document for the user and processing the document, that is, discharging after scanning, providing a copy after scanning, discharging without doing anything, and the like. These two corresponding points are preliminary set by the environmental setting.

When the initial operation is end, it becomes in the wait condition. The procedures to scan a document in the state of the wait condition will be described. When the user inserts a document to the inserting section A, the paper detection sensor 210 detects that the document was inserted, and when the document is inserted to the inside, it contacts to the stopper 211 so that there exists a position where it cannot be inserted any more. In this point, the roller 208 for document pickup and conveyance waits in the lower side so that it does not interfere the insertion of the document.

After a predetermined time after the paper detection sensor 210 detected that the document was inserted (slightly shorter time than estimated time that the document contacts to the stopper 211), the roller 208 for document pickup and conveyance is moved to the upper side and clamps the document by a roller nip section so that the document is guided to the document tray 10 by starting the conveyance toward the document tray 10. By setting the height of the roller nip section higher than the stopper 211, the stopper 211 is not interfered by the movement of the document on or after.

At the time that the paper detection sensor 210 detected a document, the line CIS sensor 204 starts scanning in the left and right direction so as to confirm the front edge position of the document. In addition, when the document proceeds to the document reading section and the back end of the document is detected, it judges that the document is properly set in the document reading section so that the drive of the conveyance belt 207 stops. Prior to the detection of the back end of the document, when the front end of the document comes out of the document tray 10, an error message is generated to the user, and the drive of the conveyance belt 207 stops and waits for a user's instruction.

After the document was set on the document tray 10, the normal scan operations are executed. After the line CIS sensor 204 corrected the document density, an official data reading scan that scans in the left and right direction is performed. The scan data can be displayed on the PC display when it is connected to the PC (not shown) so that it is determined what the user desires.

Also, in the present example of the multifunction device provided with the touch panel 7 functioning as a display, it can be displayed on the touch panel 7. If it is color display, the color can be confirmed. To check the quality of the scanned letters or images, the display images can be confirmed by zooming in.

Regarding the method for zooming in, generally, it is easy to use the method of moving the user's fingers directly on the display such as a smart phone, and the like. For example, when the entire document image is displayed on the display, a finger points on the display corresponding to a position that is desired to be zoomed in and the number of taps such as two taps, three taps, four taps, and the like can be changed in response to a magnification percentage. Also, by repeating two taps, it zooms in while narrowing down the position that is desired to be zoomed in. If the user desires to undo the processes, the finger sweeps in the horizontal direction and the last zooming operations are cancelled. For zooming in and out, in combination or independently, it is normally possible to use the movements of two fingers such as opening or narrowing.

Obviously, a mode automatically performing a copy process, and the like without such checking can be available. This is an appropriate mode when it considers that the speed is important. When the user did not satisfy the scan, an instruction for rescanning and an instruction for removing the document can be requested. When the user satisfies the scan, the multifunction device 1 executes printing of the acquired data when a copy is requested.

When the scan data is sent to next step (that is, copy operation, an operation for sending data to the PC, and the like), an operation for removing the document, which is different from the operation in the recording section 100, is automatically performed. By reducing the pressure of the press pad 209 and reversing the rotation of the conveyance belt 207, the document is moved toward the inserting section A. By appropriately setting a diameter of the driving roller 206, after the front edge passed the roller nip section, the front edge of the document does not follow the driving roller 206 and separates from the conveyance belt 207.

After that, it moves toward the inserting section A. At the point that the document was moved from the position of the paper detection sensor 210 was confirmed, the drive of the conveyance belt 207 is stopped. After the document was not remained in the document tray 10 was confirmed, the reading section 200 becomes in the wait condition and the series of scan operations is end. When the scan is end, the automatic operations such as an operation of discharging the document automatically improve the convenience of the user.

The longer direction of the line CIS sensor 204 may be the front and back direction parallel to the conveyance direction X of the document, or the left and right direction perpendicular to the conveyance direction X of the document. When the longer direction of the line CIS sensor is the front and back direction parallel to the conveyance direction X of the document, the length of the longer direction of the line CIS sensor can be shortened.

The multifunction device 1 as described above is provided with the case 2 having the document tray 10 in the upper part, the cover section 3 provided above the case 2 and covering the document tray 10, the reading section 200 housed in the inside of the case 2 and reading the document G1 placed on the document tray 10, the recording section 100 stored in the inside of the case 2 and recording on the paper P1 as a recording medium, the inserting section A inserting the document G1 between the document tray 10 and the cover section 3, and the opening section 5 for discharging a recording medium provided in the case 2 in which the paper P1 is discharged as a recording medium. The inserting section A functions as the exit in which the document G1 is discharged from between the document tray 10 and the cover section 3.

In this configuration, without opening the cover section 3, the document G1 is placed on the document tray 10 and the document G1 can be read by the reading section 200. Therefore, a space above the multifunction device 1 can be utilized for placing an object on the upper part of the cover section 3. Also, it is not necessary to provide a top plate for placing an object in the upper part of the multifunction device 1 so that the increasing size of the multifunction device 1 can be suppressed.

Also, the inserting section A and the opening section 5 for discharging a recording medium are provided in the front side of the case 2. Because of this, the controllability by the user is improved.

Further, the upper part of the cover section 3 is flat. Because of this, when an object is placed on the upper part of the cover section 3, the object can be held in a stable attitude.

Second Embodiment

In the first embodiment, the document conveyance mechanism section is provided in the cover section, but in the second embodiment, the multifunction device in which the document conveyance mechanism section is not provided in the cover section will be described.

Figure 4:
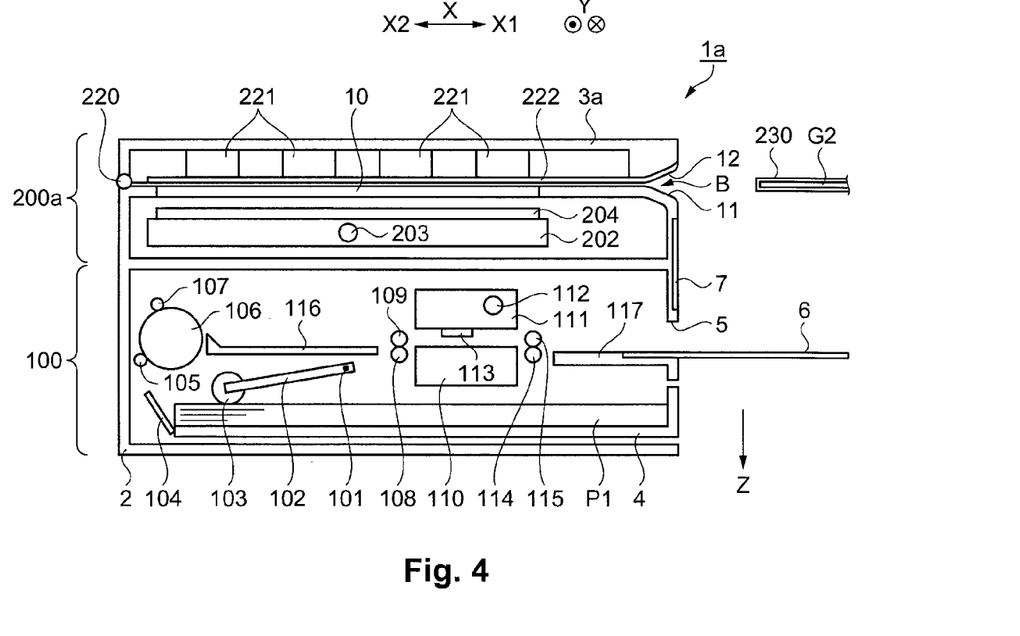
FIG. 4 is a schematic configuration of the multifunction device according to a second embodiment.

FIG. 4 is an illustration showing a multifunction device 1a related to the second embodiment viewed from the paper width direction Y, and is an illustration schematically showing a schematic configuration of the multifunction device 1a.

The multifunction device 1a is provided with the recording section 100 described in the first embodiment. Also, a reading section 200a is movably provided in the guide shaft 203 of the first embodiment, and is provided with the carriage 202 mounting the line CIS sensor 204 and the document tray 10.

A cover section 3a is connected with the case 2 and a hinge 220 so that it is turnably provided. In the cover section 3a, a press pad 222 is provided. The size of the press pad 222 is the same size or close size of the document tray 10. The press pad 222 is composed of a plurality of elastic foam materials 221 appropriately arranged between the plate material made by resin and the base material of the upper part of the cover section 3a. The plate material made by resin in which the quality of material and the thickness indicates flexible is selected.

The press pad 222 extends to the front and side surfaces so as to convolute and cover the front face end part of the cover section 3a. Thus, it performs a function that the document G2, which is scanned, comes into close contact with the document tray 10.

An inserting section B is provided to insert the document G2 between the document tray 10 and the cover section 3a in the state that the cover section 3a is closed. The inserting section B is provided in the end portion of the front side that the case 2 and the cover section 3a faces to each other.

The inserting section B is configured by a guide surface 11 formed in the end portion of the front side of the upper part of the case 2, and a guide surface 12 of the press pad 222 formed along the shape of the end portion of the front side of the cover section 3a. The front side is open.

In the state that the cover section 3a is closed, the press pad 222 comes into close contact with the lower part of the document tray 10. Thus, even though the inserting section B is opened, the document is required to have rigidity for inserting it between the press pad 222 and the document tray 10. However, the document is a paper and it is limited to enhance the rigidity by increasing strength of paper so that there is a case that the document cannot be inserted in the document reading section.

Figure 6A:
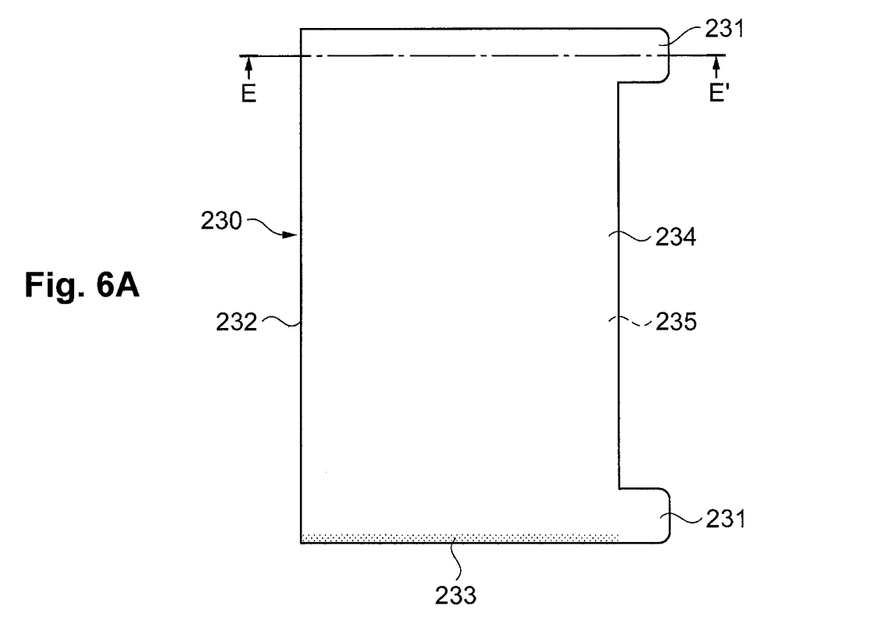
FIG. 6A is an illustration showing a folder.

Thus, in the present embodiment, a folder is provided as a holding section for housing a document. FIG. 6A is an illustration showing a folder 230. The folder 230 is composed of a resin material which is transparent and has flexibility. For example, it forms a fluororesin layer or a silicon layer on the surface of a single film layer or plural film layers mainly composed of a film which is combined with a resin essentially comprising a random polypropylene resin and certain quantities of polymer antistatic agent.

For example, the random polypropylene resin may be propylene ethylene random copolymer. For example, the polymer antistatic agent may be polyether ester amide, ethylene oxide-epichlorohydrin, polyether-ester, polystyrene sulfonic acid, quaternary ammonium base containing acrylate polymer, and the like. When the fluororesin layer or the silicon layer is formed after the corona discharge treatment was performed on the surface of polypropylene resin, the strength of the layer can be improved.

Figure 6B:
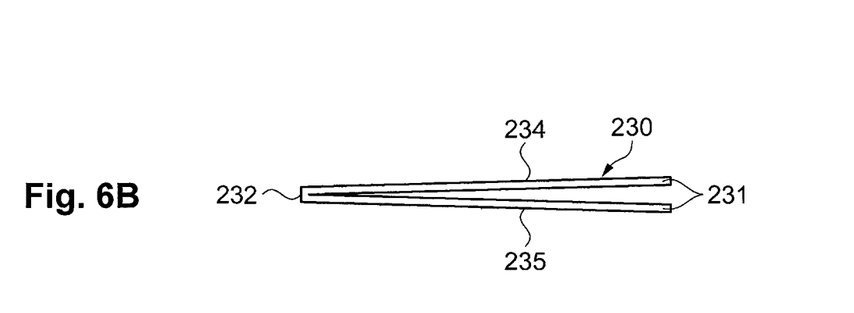
FIG. 6B is a cross-sectional view of the folder.

FIG. 6B is a cross-sectional view of the folder 230, which is viewed from the arrow direction in the cross-section E-E' of FIG. 6A. The film made by the method as described above is cut in an appropriate size. It is doubled up, and a bent portion 232 is formed. After that, a welding treatment is performed in a side 233 perpendicular to the bent portion 232

The opposite sides of the respective bent portion 232 and the side 233 are opened. Then, the document 2 is inserted into the folder 230 and it is held in the state that the document G2 is held by the surfaces 234, 235.

In the folder 230, a pair of tabs 231 projected from both end portions of the side opposing to the bent portion 232 is formed. Because of this, a user can pull the folder 230 out in the state inserted between the document tray 10 and the cover section 3a, by gripping the tabs 231. Also, a pushing depth (length) when the folder 230 was inserted by pushing from the inserting section B can be determined.

The procedures for reading a document in the multifunction device 1a will be described. The multifunction device 1a is in the wait condition in the same manner as the embodiment 1. The document G2 is set in the provided transparent folder 230 on the basis of the bent portion 232 and the welded side 233.

The transparent folder 230 is pushed in from the inserting section B. It can determine whether or not the pushing depth is appropriate by the tabs 231. That is, the appropriate pushing depth and the appropriate parallelism can be intuitively determined by comparing the protrusion level of the tabs 231 from the inserting section B and the protrusion level of both ends of the tabs 231.

The folder 230 can be smoothly inserted by forming the guide surface 11 formed in the upper end portion of the front side of the case 2 and the guide surface 12 in which the press pad 222 extends to the front side.

At the point that the document G2 is set on the document tray 10, a scanning or a copying is instructed by controlling the touch panel 7. If it is a scanning, a scan data is determined by the user as described in the first embodiment. If it is a copying, a copy is produced by starting the recording section 100 without waiting the determination of the user.

At the point that the scanning was completed, the folder 230 is pulled and discharged out from the inserting section B by gripping the tabs 231 of the folder 230. The tabs 231 are formed in two portions of the both ends so that the operation for pulling is securely performed.

As described above, the multifunction device 1a described in the present embodiment is provided with a folder 230 having translucency and flexibility as a holding section, which is insertable between the document tray 10 and the cover section 3a, and holds the document G2. The reading section 200 reads the document G2 held in the folder 230 in the state that the folder 230 is inserted between the document tray 10 and the cover section 3a.

In this configuration, it is possible to insert the folder 230 housing the document G2, which has a low rigidity, between the document tray 10 and the cover section 3a.

Third Embodiment

Figure 5:
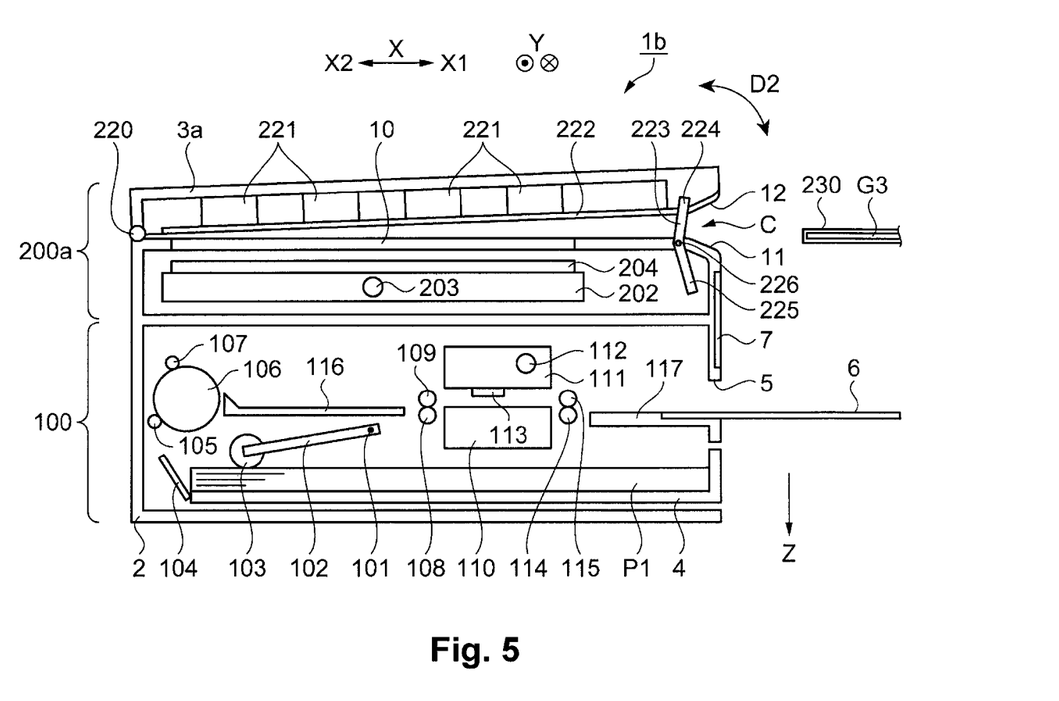
FIG. 5 is a schematic configuration of the multifunction device according to a third embodiment.

In the third embodiment, a multifunction device provided with a mechanism adjusting a height position of the cover section will be described. FIG. 5 is an illustration showing a multifunction device 1b related to the third embodiment viewed from the paper width direction Y, and is an illustration schematically showing a schematic configuration of the multifunction device 1b. In the multifunction device 1b, a lever 223 is turnably provided as a height adjustment mechanism section adjusting a height position of the cover section 3a.

A turning shaft 226 of the lever 223 is provided in the front upper part of the case 2. One of the end portions 224 of the lever 223 is connected with the cover section 3a. The user grabs the other end of the end portions 225 and turns the lever 223 as shown in the arrow D2. Because of this, the cover section 3a is turned in a hinge 220 as a fulcrum so that the height position from the document tray 10 is adjusted.

When the folder 230 is inserted between the document tray 10 and the cover section 3a, a pressure is generated by a viscoelastic foam material 221 and the press pad 222. An inserting section C can be stretched by providing the lever 223 and adjusting the height of the cover section 3a in accordance with turning the cover section 3a. That is, the folder 230 in which a document G3 configuring a thick paper is held can be easily inserted and discharged from the inserting section C. When the cover section 3a is turned by turning the lever 223, the moving amount is small so that it is possible to utilize a space above the top plate. Other configurations of the multifunction device 1b are the same configuration as the multifunction device 1a as described in the second embodiment.

Figure 7:
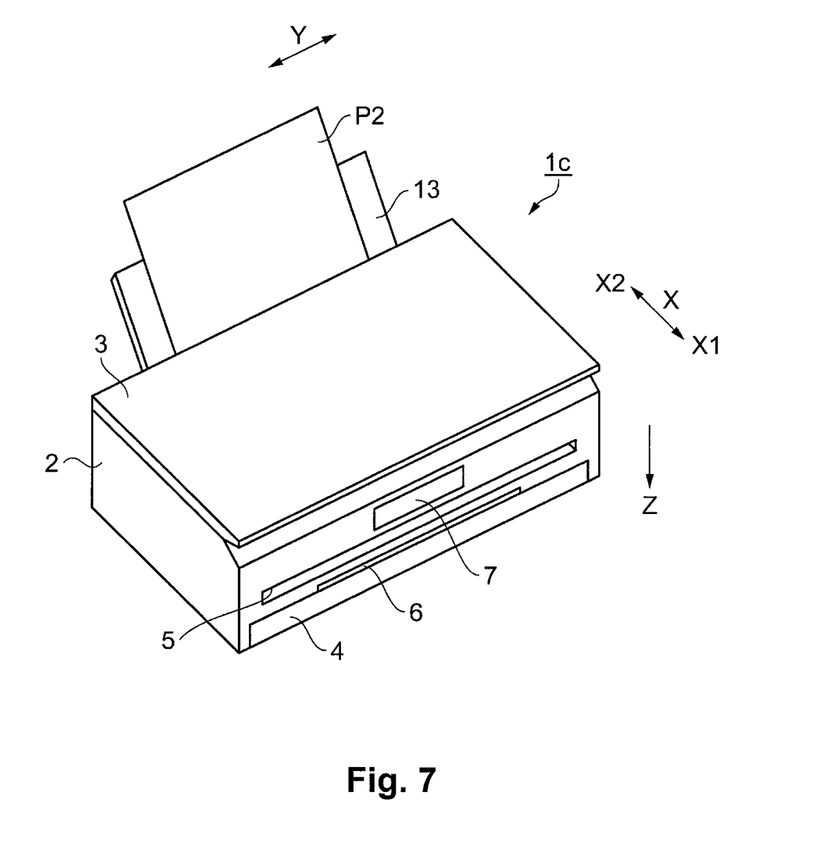
FIG. 7 is a perspective view showing an appearance of the multifunction device provided with a placing section that places a paper in the back side.

FIG. 7 is a perspective view showing an appearance of the multifunction device 1c provided with a placing section 13 that places a paper P2 in the back side. The paper P2 placed on the placing section 13 is fed in the inside of the case 2 and is recorded by the recording section (not shown) housed in the inside of the case 2. Then, it is discharged from the opening section 5 for discharging a recording medium, and is placed on the stacker 6, which was pulled out to the front side. Other configurations are the same configuration of the multifunction device 1 described in the first embodiment. The present invention applies to the multifunction device 1c provided with such placing section 13 in the back side.

In the first embodiment to the third embodiment, the inserting sections A, B, C and the opening section 5 for discharging a recording medium are provided in the front side of the case 2, but the inserting section and the opening section for discharging a recording medium may be provided in the same side surface.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A multifunction device comprising:
a case having a document tray provided in an upper part thereof;
a cover section provided above the case and covering the document tray;
a reading section housed in an inside part of the case and configured to scan a document that is placed on the document tray;
a recording section housed in the inside part of the case and configured to record on a recoding medium;
an inserting section configured to insert the document between the document tray and the cover section; and
an opening section provided in the case and configured to discharge the recording medium recorded by the recording section;
the inserting section functioning as an exit that discharges the document from between the document tray and the cover section, and
an opening of the inserting section being defined by a guide surface formed on the case and a guide surface formed on the cover section with the guide surface of the case and the guide surface of the cover section being inclined with respect to a direction of inserting the document so that the guide surface of the case and the guide surface of the cover section guide the document being inserted into the opening.

2. The multifunction device according to claim 1, wherein the inserting section and the opening section are provided in the same surface side of the case.

3. The multifunction device according to claim 2, wherein the inserting section and the opening section are provided in a front side of the case.

4. The multifunction device according to claim 1, wherein an upper part of the cover section is flat.

5. The multifunction device according to claim 1, further comprising
a holding section having translucency and flexibility, configured to hold the document, and configured to be inserted between the document tray and the cover section, wherein
the reading section reads the document held in the holding section in a state that the holding section is inserted between the document tray and the cover section.

6. The multifunction device according to claim 1, further comprising a height adjustment mechanism section for changing a height between the case and the cover section.

* * * * *